Aug. 7, 1951  S. S. WATKINS  2,562,995
SUSPENDED FRAME TYPE TIRE BEAD LOOSENING PRESS
Filed Jan. 14, 1946  2 Sheets-Sheet 1
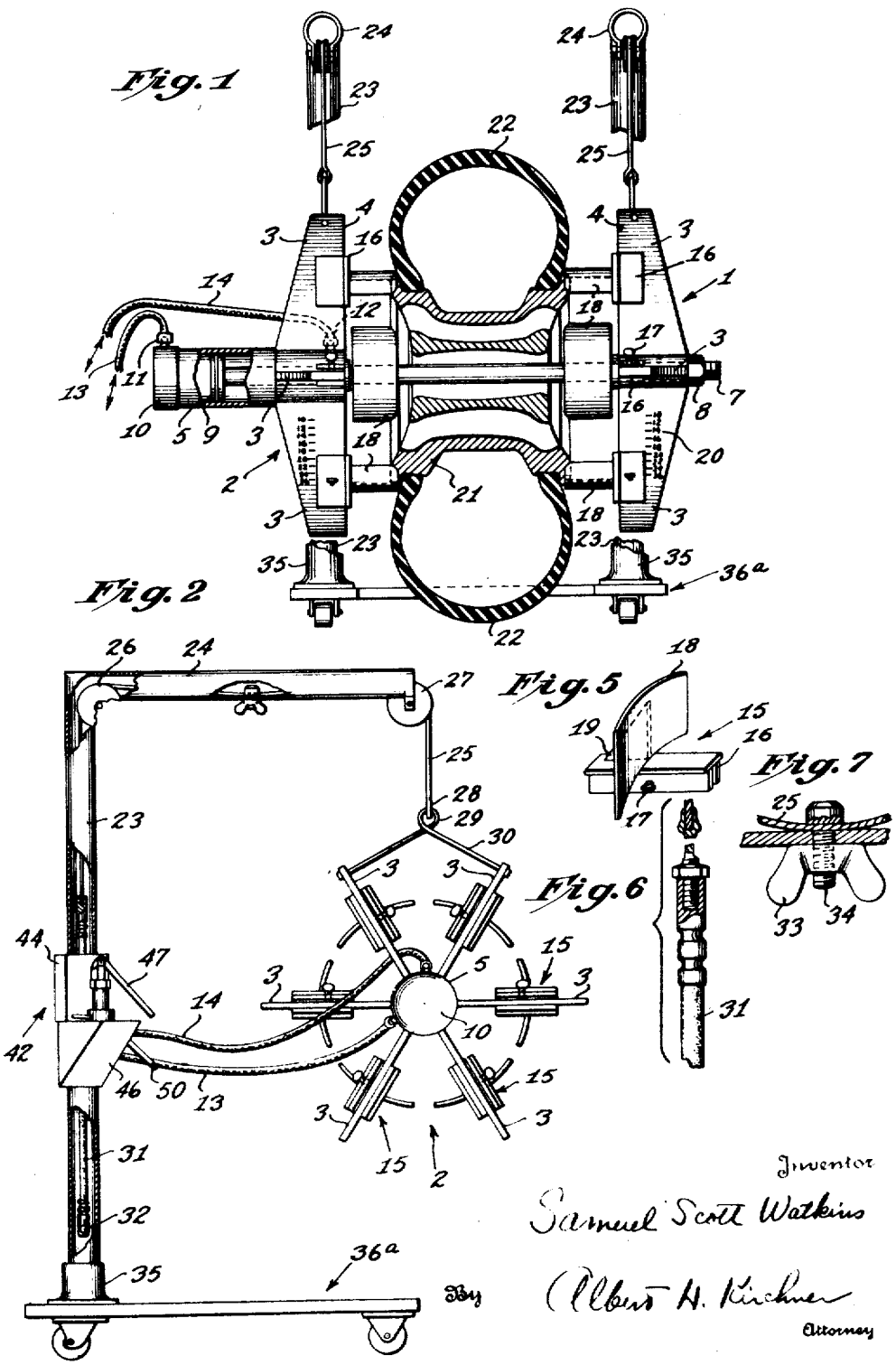
Inventor
Samuel Scott Watkins
By Albert H. Kirchner
Attorney

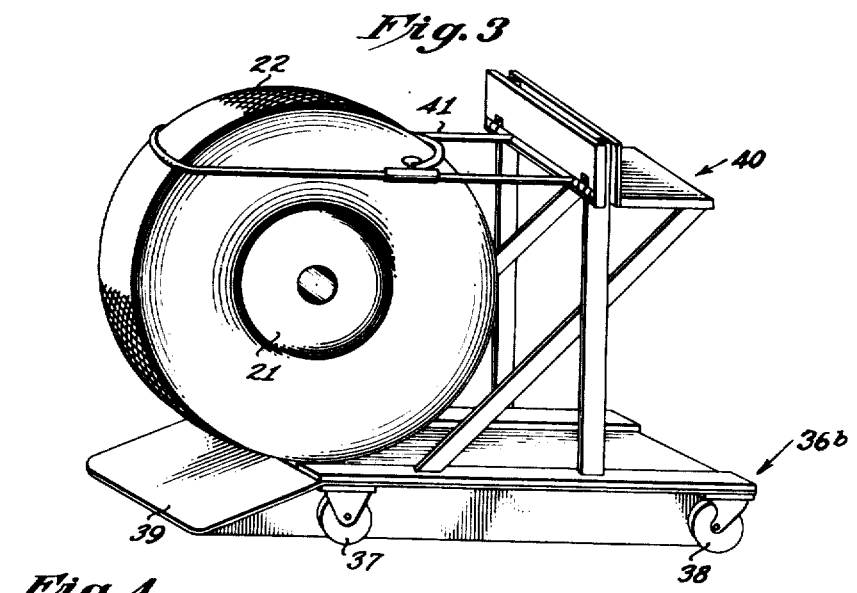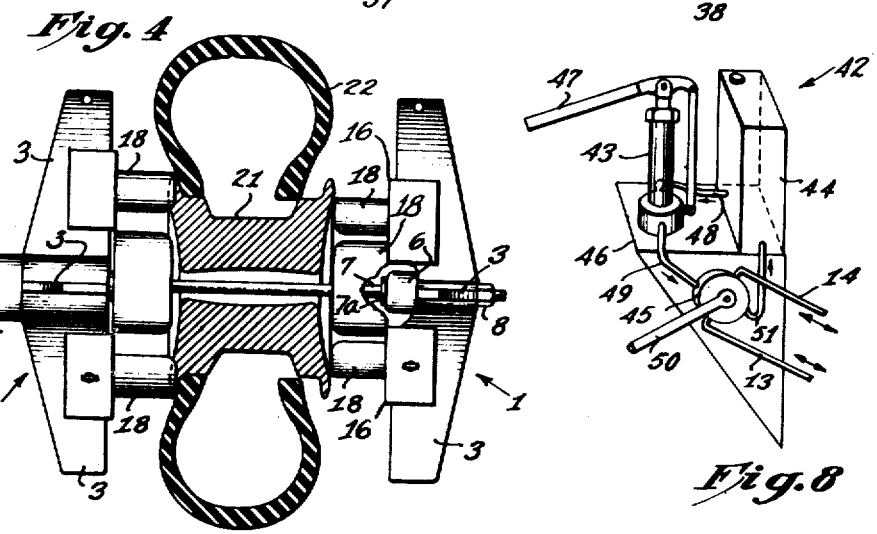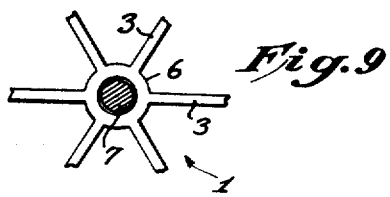

Patented Aug. 7, 1951

2,562,995

UNITED STATES PATENT OFFICE 2,562,995

SUSPENDED FRAME TYPE TIRE BEAD LOOSENING PRESS

Samuel Scott Watkins, Miami, Fla.

Application January 14, 1946, Serial No. 641,129

6 Claims. (Cl. 157—1.2)

This invention relates to pneumatic tire changing equipment and more particularly it provides a machine in the form of a press for loosening tire casing beads from their operative position seated against the rim flanges of vehicle wheels.

The work of removing tire casings from their wheels presents no great difficulty where the wheels and tires are all of small or moderate size, as in the case of most automobile equipment, or where the work is done only occasionally, as incidentally to other service in an automobile repair shop. As a rule, standard tire irons, hammers, and other hand tools are sufficient for such purposes. However, where the casings and wheels are of large size and are very heavy and cumbersome, as in the case of most airplane running gear, the changing of tires presents a serious problem. This is particularly true of airport service establishments, where it is common to employ the full time of a complete crew to make quick changes of worn or damaged casings from their wheels. Many such casings are too large and heavy to be handled by one man or to be stripped from their wheels by conventional hand tools. The present invention is intended to provide special equipment for facilitating the removal of such casings quickly by a single workman.

The chief objects of the invention are to provide mechanical equipment of the class indicated which will be simple in construction, durable and inexpensive to make, which will be rapid and efficient in operation, which may be operated by nothing more than manual force although power may be employed if desired, which will be adjustable easily and readily for application to a wide range of tire and wheel sizes, and which will be entirely foolproof in use so that no damage can be done to the tire or wheel or to the equipment even when operated by unskilled and inexperienced labor.

Other objects and advantages are contemplated, as will be apparent to those skilled in the art from the following specification which, taken in combination with the accompanying drawings, discloses a preferred embodiment of the invention which has been thoroughly tried out in practice and has been found to give satisfactory and reliable results.

In the accompanying drawings,

Figure 1 is a front elevational view of a preferred embodiment of the invention, with certain of the parts broken away or shown in section;

Fig. 2 is a side elevational view of the apparatus shown in Fig. 1;

Fig. 3 is a perspective view of a dolly employed as part of the complete equipment in the preferred embodiment, showing a tire and wheel assembly mounted in place thereon;

Fig. 4 is a front elevational view of the press frames adjusted in position to loosen the second bead of a tire from its rim seat, after the first bead has been separated from its seat;

Fig. 5 is a detail perspective view of one of the adjustable abutments which are provided on the two frames of the machine;

Fig. 6 is a detail view of a portion of one of the resilient line elements used in adjusting the height of the frames;

Fig. 7 is a detail view of the means for fixing the height adjustment;

Fig. 8 is a perspective view of the fluid pressure means for applying force to the casing beads to dislodge them from their seats on the wheel; and Fig. 9 is a detail view in end elevation of the central portion of one of the frames.

Generally speaking, the invention provides a pair of side frames between which a tire casing mounted on a wheel can be positioned and which can be forced toward each other to apply pressure to the beads of the casing for the purpose of dislodging those beads from their seats against the wheel flanges. The frames are so related to each other and to the wheel and casing that force of adequate value to dislodge even the most tenaciously adhering bead is applied substantially continuously around the entire bead periphery. The arrangement is such that the two beads of the tire can be subjected simultaneously to dislodging pressure. If this results in only one of the beads becoming separated from its flange, the device can be quickly adjusted to apply force to the other bead so as to dislodge it.

The result of a complete operation of the device is separation of both casing beads from the two flanges of the wheel and movement of the beads toward the center of the rim. From that position the casing and wheel are easily separated by conventional means and methods. In the case of a drop center rim, such as is used for the purpose of illustration in the present application, the separation may be accomplished by moving the wheel or the tire radially so as to seat the two beads, along a few degrees of arc, down in the drop center, and then lifting the diametrically opposite portion of the beads out from the drop center and past one of the rim flanges. Wheels of other than the drop center type are handled differently, according to their design, but in all cases the present machine performs the essential preliminary operation of separating or unseating the casing beads from the wheel flanges.

The invention comprises, in the illustrated embodiment, a pair of frame members 1, 2, each of which comprises a hub and a plurality of equally spaced radiating arms 3 provided in any convenient number, as for example the six shown. Each arm is conveniently made in the form of a flat plate having its wide dimension in a plane which includes the axis of the frame member and having at least its inboard edge 4 made straight and normal to that axis. The outboard edge may be inclined so that the plate tapers radially outwardly and is correspondingly widened or thickened for greater strength near its radially inner end, the better to resist the pressures that are imposed on it during use.

The frame 1, shown at the right in Fig. 1, has its hub made in the form of a short tubular sleeve 6 of relatively small bore, open at both its ends, with the arms 3 of the frame welded about the outer periphery of the sleeve, as best shown in Fig. 9. The hub of the frame 2, shown at the left in Fig. 1, is of larger bore and is secured by a setscrew (not shown) around the radially reduced axially inner end portion of a fluid pressure cylinder 5 which extends axially outwardly from this frame. The arms 3 of this frame are welded to the hub thereof.

A rod 7 is passed loosely through the hub 6 and is threaded on its end portion which projects from that hub for reception of a nut 8 which bears against the end of the hub and holds the frame captive on the rod against movement axially off of it. The rod 7 is elongated, terminating in the cylinder 5 where it is provided with a piston 9, normally occupying a position in the intermediate zone of the cylinder, about midway between the inner and outer ends thereof. The outer end of the cylinder is closed by a head 10 and the inner end is packed with a gland through which the rod 7 makes a tight, sliding fit. Fluid ports in the form of a nipple fitting 11 at the head of the cylinder 5 and a similar nipple fitting 12 at the inner end of the cylinder are connected with flexible fluid lines 13 and 14 respectively so that fluid under pressure can be admitted to either side of the piston 9 and relieved from its opposite side to move the piston toward either end of the cylinder. This of course will have the effect of forcing the frames 1, 2 toward or away from each other. In order to make the movement of the frames in separation positive, the rod 7 may, if desired or thought necessary, be provided with a fixed flange or enlargement 7a, as shown in Fig. 4, bearing against the inner edge of the sleeve 6 of the frame 1 during movement of that frame to the right in response to pressure applied to the piston 9 through the cylinder port 11.

It will be apparent from the construction as thus far explained that when the frames are moved toward each other they can be caused to exert compressive force on the two beads or side wall areas of the casing of a wheel and tire assembly positioned between them, as shown in Fig. 1, or on one of the beads or side walls and one side of the wheel, as shown in Fig. 4. In order to concentrate the application of pressure to the beads or side wall areas adjacent to the beads, or to the wheel rim, which ever may be desired, each of the arms 3 of each frame is provided with an abutment element 15, shown in Fig. 5. This element comprises a shoe 16 which is slotted to receive and slide along the edge 4 of each arm 3 and has a setscrew 17 for fixing the position of the element anywhere along the length of the arm. An arcuate plate 18 is welded to the inner face of each shoe and is stiffened by a gusset 19. Calibrations 20 are inscribed on that face of each of the arms 3 which is uppermost when the frame is hung upright as shown in Fig. 2, i. e., those faces from which the lead lines are drawn from the reference numerals 3 in Fig. 2, so that all the shoes of each set of abutment elements can be fixed equally at any selected distance from the axis of their frame, in order to arrange the arcuate plates 18 in substantially the curvature of a circle of any diameter within a wide range having as its center the axis of the frame. Since the form of each plate 18 is fixed, the curvature of the set of plates mounted on each frame will not be exactly circular except in one particular adjustment of the elements 15. However, the curvature of the plates is made such that they will lie accurately on a circle when the elements are set at about the middle of their range of adjustment on the arms 3. The distortion from true circularity when the elements are adjusted further in or further out from this midpoint is not objectionable.

Each of the frames 1 and 2 is hung from above by an adjustable means through which its height can be varied to position its axis at the level of the axis of a wheel 21 having a tire casing 22 in place on it, mounted in vertical position between the two frames, as shown in Fig. 1.

A convenient means for mounting each of the frames in this manner is shown in Fig. 2 and consists of a hollow upright or standard 23 provided at its top with a tubular cross arm 24 through the bores of both of which a cable 25 is trained over pulleys 26, 27 so that the outer end of the cable hangs down from the cross arm. A hook 28 is carried by this end of the cable and is engaged with an eye 29 formed in a stout rod or wire hanger 30 which spans and is hooked to the two uppermost arms of the frame which is to be hung by the cable. To make this support adjustable end of a counterbalancing means which may be a weight or the resilient element 31 which has its other end anchored at 32 near the bottom of the upright 23. The resilient element here shown is a shock cord of the type commonly employed in the shock absorbing wheel struts of airplane landing gear. Such a shock cord contains rubber and is admirably suited to support the weight of each frame under tension which can be relieved or increased by manually lifting or lowering the frame through the whole range which may be required by the different sizes of wheels to be handled. When such adjustment has been made, a wing nut 33 may be turned down tightly on a stud 34 which projects through the cross arm 24 so as to clamp the cable 25 between the head of the stud and the wall of the cross arm, as is clearly shown in Figs. 2 and 7.

The two standards 23, one for each of the frames, may be mounted on vertical pivots fixed on a floor or against a wall, so that the two frames can be swung toward and away from each other. However, I prefer to mount these standards for rotation in step bearings 35 secured on a low castered platform or dolly 36a, as shown in Figs. 1 and 2, so that the whole apparatus is made portable.

It is convenient also to mount the wheel and tire assembly 21, 22 on a dolly which will hold it in upright or vertical position between the two frames. This dolly may be the one which supports the standards 23 and the frames, but I prefer to provide it in the form of a separate castered platform 36b, best shown in Fig. 3. This dolly 36b may have fixed rollers 37 and pivoted rollers 38 at its opposite ends and it may be provided with a ramp 39 at one end and an upstanding frame 40 at its other end providing a shelf on which may be supported small hand tools and wheel, brake and other parts that are being repaired or replaced. However, the principal function of this frame 40 is to support a pivoted yoke 41 which can be dropped down over the top of a wheel and tire casing assembly 21, 22 which has been rolled up the ramp 39 and hold this assembly on the bed of the dolly, all as shown in Fig. 3. The assembly thus mounted can be rolled over the ground or a floor and pushed up against the dolly 36a to bring the assembly directly between the two frames, with the centers of the frames positioned at the same height as the center of the wheel assembly. At this stage of operation the two frames are not coupled together by engagement of the nut 8 on the rod 7 as shown in Fig. 1, but are swung angularly apart. Then the frames are swung together so that the rod 7 will penetrate the wheel bore and enter the hub 6 of the frame 1. The nut 8 is then threaded on to the rod 7 and the abutment elements 15 are adjusted along the calibrations 20 in accordance with the size of the wheel. This predetermined so as to bring the plates 18 directly opposite areas of the side wall of the tire casing which are close to the rim flange of the wheel. All that is necessary now, to break one or the other of the two casing beads away from its rim flange, is to force the two frames toward each other. This is accomplished by admitting fluid under pressure through the port 12, which will force the piston 9 to the left in Fig. 1 and, by shortening the extended length of the rod 7, will pull the two frames toward each other and will press the two sets of abutment plates 18 forcibly against the two side walls of the tire casing.

A convenient and preferred fluid pressure applying mechanism is shown at 42 in Fig. 2 and in detail in Fig. 8. This consists of a pump 43, a liquid reservoir 44 and a control valve 45, all mounted on a shelf 46 carried by the standard 23 which supports the frame 2. The pump is of small bore and is operated manually by a handle 47. It draws fluid, preferably a liquid, from the reservoir 44 through a tube 48 and has a plunger of very small cross sectional area relative to that of the piston 9, and it forces the liquid out through a tube 49 into the valve 45. This valve is a conventional two-way control which, depending on the position of its handle 50, will discharge liquid through one or the other of the tubes 13, 14, which are connected respectively to the ports 11 and 12 in the cylinder 5, and liquid will be returned to the valve through the other tube 14 or 13 and be discharged through the tube 51 into the reservoir 44.

The valve handle 50 is set and the pump handle 47 is operated initially to move the piston 9 to the left in Fig. 1 for forcing the two frames toward each other and compressing the two sets of abutments 15 against the tire casing beads or side walls. Because of the difference in cross sectional area of the piston 9 and the piston of the pump 43, the mechanical advantage is very great and is sufficient to apply a very large force against the casing beads, a force which is sufficient to dislodge one or both of them from their wheel flanges. If only one bead becomes dislodged from its wheel flange, the pumping is continued to separate the two frames. Then the abutments 15 of the set adjacent to that bead which has been dislodged are all adjusted inwardly so that their plates 18 are aligned with the wheel itself, as shown at the righthand side of Fig. 4. Pumping is resumed with the valve 45 set to pull the frames together, which now causes compressive force to react between the wheel 21 and that bead of the casing 22 which is still stuck against its wheel flange. This is continued until that bead is dislodged. Both of the beads are then completely separated from the wheel flanges and are positioned in the center of the rim. The wheel and tire assembly is then taken from between the frames and the casing is removed by any conventional method.

The machine is then ready to receive another wheel and casing assembly for a repetition of the operation.

It is believed that the construction and advantages of the invention will be sufficiently apparent from the foregoing exemplification of a preferred embodiment. It is to be understood that the invention may be embodied in other and further modified forms, all within the spirit of the inventive principles as defined by the appended claims. It is also to be understood that not all of the inventive features of the structure need be combined in any single embodiment, since many of them are capable of being employed to advantage without relation to others.

I claim:

1. In a tire bead loosening press, a pair of frames mounted in spaced relation, each of said frames comprising a hub and a plurality of radiating arms, means for positioning between the frames a wheel having a rim in which the beads of a tire casing are seated, an abutment element on each arm with the set of elements on each frame facing those of the other frame, and means mounting the elements for adjustment lengthwise of the arms to engage the elements selectively with the rim or with the casing, all of said elements being identical and adapted to engage either the rim or the casing, and means for moving the elements of each set toward those of the other to push said beads into the center of said rim.

2. In a tire bead loosening press, a pair of frames mounted vertically in horizontally spaced relation, each of said frames comprising a hub and a plurality of radiating arms, means for supporting in vertical position between the frames a wheel having a rim in which the beads of a tire casing are seated, an abutment element on each arm with the set of elements on each frame facing those of the other frame, means mounting the elements for adjustment lengthwise of the arms to engage the elements selectively with the rim or with the casing, all of said elements being identical and adapted to engage either the rim or the casing, and means for moving the elements of each set toward those of the other to push said beads into the center of said rim.

3. In a tire bead loosening press, a pair of frames mounted in spaced relation, each of said frames comprising a hub and a plurality of radiating arms, means for positioning between the frames a wheel having a rim in which the beads of a tire casing are seated, means for moving the frames toward the wheel, and identical abutment elements mounted on all the arms, each element including an arcuate segment adjustable along the arm to engage selectively the adjacent side wall of the tire casing or the rim and push the bead of the casing into the center of said rim.

4. In a tire bead loosening press, a pair of frames mounted in spaced relation, each of said frames comprising a hub and a plurality of radiating arms, means for positioning between the frames a wheel having a rim in which the beads of a tire casing are seated, means for moving the frames toward the wheel, and identical abutment elements mounted on all the arms, each element comprising a base slidable along the arm, means for fixing said base at adjusted positions radially of the wheel, and an arcuate segment projecting from the base and adapted to engage selectively the adjacent side wall of the tire casing on the rim and push the bead of the casing into the center of said rim.

5. A tire bead loosening press comprising means for mounting in a vertical plane a wheel and tire casing assembly of any one of a plurality of different diametrical sizes, a pair of press frames one at each side of the mounted assembly, means supporting the frames for swinging them laterally inwardly toward the opposite sides of the mounted assembly, means for adjusting the height of the frames to align their axes with each other and the axis of the assembly, and means for moving the frames toward each other in compressing relation to the casing of the assembly.

6. A tire bead loosening press as claimed in claim 5 in which each of the press frames includes a hub and a plurality of radial arms with an abutment element longitudinally adjustable along each arm to a position on the frame adapted to contact the casing of the assembly when the frames are moved toward each other in compressing relation thereto.

SAMUEL SCOTT WATKINS.

REFERENCES CITED

The following references are of record in the file of this patent:

UNITED STATES PATENTS

| Number | Name | Date |
| --- | --- | --- |
| 1,244,245 | Robertson | Oct. 23, 1917 |
| 1,399,351 | Lee | Dec. 6, 1921 |
| 1,564,496 | Staugaard | Dec. 8, 1925 |
| 1,667,351 | Levitt | Apr. 24, 1928 |
| 1,724,813 | Weaver et al. | Aug. 13, 1929 |
| 1,758,264 | Senger | May 13, 1930 |
| 2,043,169 | Hawkinson | June 2, 1936 |
| 2,373,975 | Plumeau et al. | Apr. 17, 1945 |
| 2,416,195 | Mitchell | Feb. 18, 1947 |
| 2,423,652 | Kelley | July 8, 1947 |
| 2,469,723 | Greene | May 10, 1949 |